United States Patent Office 3,448,063
Patented June 3, 1969

3,448,063
CROSS-LINKED POLYMERS AND THE PROCESS FOR THEIR PREPARATION
David S. Breslow, Munich, Germany, assignor to Hercules Incorporated, a corporation of Delaware
No Drawing. Filed May 17, 1965, Ser. No. 456,485
Int. Cl. C08f *45/72;* C08g *23/20, 51/84*
U.S. Cl. 260—2             12 Claims

ABSTRACT OF THE DISCLOSURE

Unsaturated polymers and epihalohydrin polymers can be cross-linked with poly-functional sydnones. The polyfunctional sydnones are relatively new compounds having the formula I.
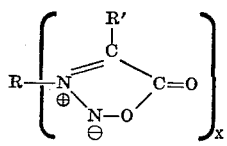

II.
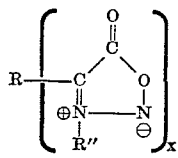

III.
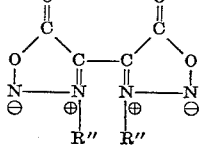

where R is alkylene, cycloalkylene, arylene, arylene-dialkylene, alkylene-diarylene, or cycloalkylene-dialkylene; R' is hydrogen, alkyl, cycloalkyl, aryl, alkaryl, aralkyl, or hydrogen; R" is hydrogen, alkyl, cycloalkyl, aryl, alkaryl, or aralkyl; and x is an integer greater than 1.

---

This invention relates to cross-linking polymers and to the cross-linked products so produced. More, particularly it relates to cross-linking polymers with polyfunctional sydnones, and to the resulting cross-linked products.

The cross-linking systems used in the prior art generally are adversely affected by the presence of air and moisture.

In accordance with this invention, it has been found tha various types of polymers can be cross-linked with polyfunctional sydnones to produce tough, solvent resistant cross-linked products. The instant cross-linking procedure is not adversely affected by the presence of air and moisture.

The polyfunctional sydnones of this invention have the general formula selected from the group consisting of:

I. 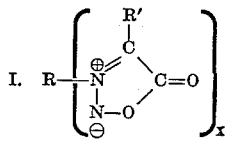     II. 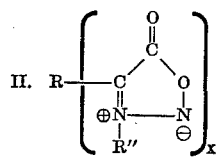

III. 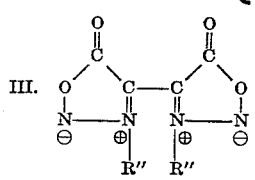

wherein R is a radical selected from the group consisting of alkylene radicals, such as methylene, ethylene, tetramethylene, hexamethylene, heptamethylene, octamethylene, decamethylene, dodecamethylene, octadecamethylene and the like; arylene radicals, such as o-, m-, and p-phenylene; arylene-dialkylene radicals, such as o-, m-, and p-xylylene; cycloalkylene radicals, such as cyclopentylene, cyclooctylene and the like; alkylene-diarylene radicals, such as methylene bis(o-, m- and p-phenylene), ethylene bis (o-, m- and p-phenylene), and the like; and cycloalkylene-dialkylene radicals, such 1,4-cyclohexane-dimethylene. R' is a radical selected from the group consisting of hydrogen, alkyl radicals containing about 1–20 carbon atoms such as ethyl, octyl, dodecyl, octadecyl and the like, cycloalkyl radicals such as cyclohexyl, cyclooctyl and the like, aryl radicals having 1–3 rings such as phenyl and naphthyl and the like, alkaryl and aralkyl radicals where the alkyl groups contain 1–20 carbon atoms and the aryl groups have 1–3 rings; and halogen radicals such as chloro, bromo, or iodo; R" is the same as R' except that R" cannot be halogen; and x is an integer greater than 1.

In all instances, x, in the above general formula, will be at least 2. The maximum value of x will, of course, be dependent on the number of carbon atoms in R, since the value of x cannot exceed the valence of R. Generally, x can be an integer from 2 to 10.

Of particular interest in this invention are the bis (sydnones). These compounds are illustrated by general Formula I set forth above wherein x=2, i.e., they have the formula IV.
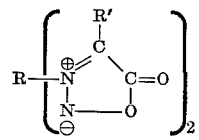

wherein R and R' are defined as above.

Exemplary of the polyfunctional sydnones which are useful in this invention are bis(sydnones) having Formula IV, such as dimethylene-bis(sydnone), dimethylene-bis(bromosydnone), dimethylene-bis(chlorosydnone), dimethylene - bis(iodosydnone), dimethylene-bis(methylsydnone), tetramethylene - bis(sydnone), hexamethylene-bis(sydnone), hexamethylene - bis(bromosydnone), p-phenylene - bis(sydnone), methylene-bis(o-, m- and p-phenylene sydnone), 1,4 - cyclohexylene - bis(sydnone), p-xylylene-bis(sydnone), and the like; polyfunctional sydnones of general Formula I having more than two sydnone groups, such as 1,3,5-phenyl tris(sydnone), 1,3,5-cyclohexane tris(sydnone), 1,3,5-phenyl tris(methylsydnone), 1,3,5-naphthalene tris(sydnone), 1,3,5,7-naphthalene tetrakis(sydnone), 1,3,6,8,9,10 - anthracene hexakis (sydnone); polyfunctional sydnones of general Formula II, such as, methylene 4,4' - bis(sydnone), p-phenylene 4,4'-bis(sydnone), ethylene 4,4'-bis(sydnone), methylene 4,4'-bis(3-phenyl-sydnone), and the like; and difunctional sydnones of general Formula III, such as, 3,3'-bis(benzyl)-4,4'-bis(sydnone), 3,3'-bis(cyclohexyl)-4,4'-bis(sydnone), 3,3'-bis(phenyl)-4,4'-bis(3-methylsydnone, and the like. Mixtures of two or more polyfunctional sydnones can be used in accordance with this invention, if desired.

The polyfunctional sydnones used in this invention are prepared by cyclodehydration of the appropriate polynitroso compounds. This dehydration can be effected with any of various dehydrating agents such as acetic anhydride, trifluoroacetic anhydride, thionyl chloride, and carbonyl chloride. The method for the preparation of the polyfunctional sydnones used in this invention is described more fully in the prior art.

The production of the instant polyfunctional sydnones will be further illustrated by the following example. All parts are by weight unless otherwise specifically indicated.

EXAMPLE 1

One hundred and ten parts of trifluoro-acetic anhydride are added, with stirring, to a suspension of 27 parts of N,N'-dinitroso hexamethylene-bis(glycine) in 325 parts of methylene chloride at such a rate that the temperature does not rise above 10° C. The resulting solution is refluxed for one hour, and then the solvents are removed under reduced pressure. The residual oil is dissolved in 225 parts of chloroform and then 300 parts of water are added. The solid product which is formed is filtered and recrystallized from alcohol to yield 16.5 parts of hexamethylene-bis(sydnone) having a melting point of 118–120° C.

EXAMPLE 2

A mixture of 10 parts of N,N'-dinitroso-p-phenylene bis(glycine) and 65 parts of acetic anhydride is heated for 3 hours at 70–80° C. After cooling, the precipitate is filtered and washed with ether and acetone to yield 5 parts of p-phenylene bis(sydnone), M.P. above 360° C.

*Analysis.*—Calculated for $C_{10}H_6N_4O_4$: C, 48.77; H, 2.46. Found: C, 48.90; H, 2.65.

EXAMPLE 3

A mixture of 10 parts of N,N',N''-trinitroso-1,3,5-benzene tris(glycine) and 120 parts of acetic anhydride is heated for 3 hours at 70–80° C. After cooling, the precipitate is filtered and washed with ether and acetone to yield 4 parts of 1,3,5-benzene tris(sydnone).

*Analysis.*—Calculated for $C_{12}H_6N_6O_6$: C, 43.64; H, 1.83. Found: C, 43.89; H, 1.80.

Generally, any type of unsaturated polymer containing ethylenic unsaturation wherein there is at least one hydrogen radical attached to at least one of the carbon atoms of the ethylenic double bond, can be cross-linked with the above described polyfunctional sydnones in accordance with this invention. In addition, polymers containing acetylenic unsaturation can be cross-linked by the process of this invention. Among the unsaturated polymers which can be cross-linked in this manner are polybutadiene-1,2; polybutadiene-1,4; styrene-butadiene copolymers; butyl rubber(polyisobutylene - isoprene copolymers); natural rubber; polyester resins, such as, for example, maleate containing polyesters; butadiene-acrylonitrile copolymers; ethylene-propylene-diene (such as dicyclopentadiene) terpolymers; polychloroprene; polyisoprene, alkyd resins, such as, for example, tall oil alkyd resins; polyether copolymers and terpolymers containing at least one unsaturated epoxide constituent, such as, for example, propylene oxide-allyl glycidyl ether copolymers and ethylene oxide-epichlorohydrin-allyl glycidyl ether terpolymers; and the like.

Another class of polymers which can be cross-linked in accordance with this invention are epihalohydrin homopolymers and copolymers, which unlike the above polymers contain no unsaturation. The mechanism through which this cross-linking occurs is not known, but it may be that under cross-linking conditions hydrogen chloride is split out yielding unsaturated centers, which are then available as cross-linking sites. Exemplary of this class of polymers are polyepichlorohydrin, polyepibromohydrin, copolymers and interpolymers of epichlorohydrin with alkylene oxides, such as, ethylene oxide, propylene oxide and butene oxides, for example, a copolymer of epichlorohydrin and ethylene oxide, a copolymer of epibromohydrin and propylene oxide, a terpolymer of epichlorohydrin, ethylene oxide and propylene oxide, and the like.

The instant cross-linking is carried out by contacting the polymer and a minor amount of the polyfunctional sydnone cross-linking agent at an elevated temperature for a time sufficient for the desired degree of cross-linking to occur. The amount of polyfunctional sydnone added to the polymer will depend on the amount of cross-linking desired, with from about 0.01% to about 50% by weight of the polymer of the sydnone being useful, and from about 0.1% to about 10% by weight of the polymer of the sydnone being preferred.

The rate of cross-linking will depend on the temperature at which the polymer and the polyfunctional sydnone are contacted. Elevated temperatures must be used to achieve the desired cross-linking. Temperatures between about 100–300° C. can be used, but cross-linking temperatures between about 120–200° C. are preferred.

The instant polyfunctional sydnone cross-linking agents are brought into uniform contact with the polymer to achieve the desired cross-linking. This uniform contacting can be achieved by milling the polymer and the polyfunctional sydnone in a conventional rubber mill, by dissolving the cross-linking agent in a solvent solution of the polymer, or by other suitable procedures which will be readily apparent to those skilled in the art. This contacting will result in the polyfunctional sydnone cross-linking agent being uniformly distributed throughout the polymer mass, so that uniform cross-linking can be achieved.

Additional ingredients can be incorporated in the polymer-polyfunctional sydnone blend, if desired. Common rubber additives, such as, for example, extenders, fillers, pigments, plasticizers, and stabilizers can be included. In many cases, however, it will be more desirable to omit such additives and add only the polyfunctional sydnone to the unsaturated polymer.

The cross-linked polymers of this invention are hard, tough resins which are substantially insoluble in water and hydrocarbon solvents. They exhibit improved tensile properties over their uncured counterparts. These polymers are useful in various rubber applications, such as, for example, as protective and decorative coatings for various substrates including wood, metals, paper, and plastics; as ingredients of tires for motor vehicles, tubing, pipes, and other rubber articles; and the like.

The preparation of the instant cross-linked polymers will be further illustrated by the following specific examples. All parts and percentages referred to therein are by weight unless otherwise specifically indicated. The molecular weight of the polymers used in these examples is indicated by their Reduced Specific Viscosity. By the term "Reduced Specific Viscosity" (RSV) is mean the $\eta_{sp}/c$, determined on a 0.1% solution (0.1 gram of the polymer per 100 ml. of solution) of the polymer in a given solvent at the specified temperature.

EXAMPLE 4

In this example 0.05 part of the hexamethylene-bis(sydnone) prepared in Example 1 is added to a solution of 0.5 gram of a maleate-isophthalate-propylene glycol polyester (maleate:isophthalate ratio=1.1) (Oronite Resin CR–19583, produced by Oronite Chemical Co.) [RSV= 0.09 in benzene at 25° C.] in 4 parts of acetone, and this mixture is allowed to evaporate to dryness at room temperature. The solid residue is heated to 140° C. and held at that temperature for 1.5 hr. The resulting product is a hard, tough material which is completely insoluble in acetone.

A control sample of polymer subjected to exactly the same procedure except that no polyfunctional sydnone is added, yields a product which is completely soluble in acetone.

EXAMPLE 5

In this example, 0.06 part of the hexamethylene-bis (sydnone) prepared in Example 1 is added, with stirring to a solution of 1.0 part of a propylene oxide-allyl glycidyl ether copolymer (containing 10% allyl glycidyl ether) [RSV=5.2 in benzene at 25° C.] in 17 parts of benzene. This mixture is allowed to evaporate to dryness at room temperature, and is then heated to 140–150° C. and held at that temperature for 25 hours. The resulting product is a hard, tough rubber which is substantially insoluble in benzene.

In a control sample which is run in exactly the same manner except that no polyfunctional sydnone is added, the rubber produced is completely soluble in benzene.

EXAMPLE 6

To a solution of 1.0 part of an amorphous poly(epichlorohydrin), [RSV=0.99 in a-chloronaphthalene at 100° C.] in 9 parts of benzene is added with mixing 0.06 part of the hexamethylene-bis(sydnone) prepared in Example 1. This mixture is allowed to evaporate to dryness at room temperature, and the solid residue is thereafter heated at 140–150° C. for 2 hours. The resulting product is a hard, tough rubber, which is insoluble in benzene.

In a control run which is made in exactly the same manner except that no polyfunctional sydnone is added, the rubber product which results is completely soluble in benzene.

EXAMPLE 7

To a solution of 1.0 part of ethylene-propylene-diene terpolymer (Nordel-1040 produced by Du Pont Co.) [RSV=1.12 in benzene at 25° C.] in about 10 parts of benzene is added, with mixing, 0.06 part of the hexamethylene-bis(sydnone) prepared in Example 1. This mixture, is heated at 140–150° C. for 2 hours, and produces a hard, tough rubber, which is substantially insoluble in benzene.

The above procedure is repated exactly, except that no polyfunctional sydnone is added. The resulting rubber is completely soluble in benzene.

EXAMPLE 8

In this example 0.05 part of the p-phenylene bis-(sydnone) prepared in Example 2 is added to a solution of 1.0 part of a maleate-isophthalate-propylene glycol polyester (maleate:isophthalate ratio=1:1) (Oronite Resin CR–19583, produced by the Aronite Chemical Co.) (RSV=0.09 in benzene at 25°) in 5 parts of acetone, and this mixture is allowed to evaporate to dryness at room temperature. The solid residue is heated to 160° and held at that temperature for 2.0 hours. The resulting product is substantially insoluble in acetone.

A control sample of polymer is subjected to the same procedure, except that no sydnone is added, and yields a product completely soluble in acetone.

EXAMPLE 9

In this example 0.006 part of the 1,3,5-benzene tris (sydnone) prepared in Example 3 is added with stirring to a solution of 1.0 part of a proylene oxide-allyl glycidyl ether copolymer (containing 10% allyl glycidyl ether) (RSV=5.2 in benzene at 25°) in 17 parts of benzene. This mixture is allowed to evaporate to dryness, and is then heated at 150° C. for 24 hours. The resulting product is substantially insoluble in benzene.

In a control sample which is run in exactly the same manner except that no sydnone is added, the rubber produced is completely soluble in benzene.

EXAMPLE 10

In this example 0.05 part of 3,3'-bis(benzyl)-4,4'-bis (sydnone) (melting point=173° C.) is mixed with a solution of 1.0 part of epichlorohydrin-ethylene oxide-allyl glycidyl ether terpolymer (60–30–10 weight percent), RSV=3.2 in a-chloronaphthalene at 100°, in 30 parts of acetone, and the resulting mixture is evaporated to dryness at room temperature. The solid rubber residue is then heated at 160° for 3.0 hours. The product is substantially insoluble in acetone.

EXAMPLE 11

In this example 0.05 part of 3,3'-bis(2-cyanoethyl)-4,4'-methylene bis(sydnone), melting point=200–201° C., is mixed with a solution of 1.0 part of the maleate-isophthalate-propylene glycol polyester described in Example 4 in 5 parts of acetone, and this mixture is allowed to evaporate to dryness at room temperature. The solid residue is heated to 160° and held at that temperature for 2.0 hours. The resulting product is substantially insoluble in acetone.

What I claim and desire to protect by Letters Patent is:

1. The process of cross-linking polymers selected from the group consisting of unsaturated polymers and epihalohydrin polymers which comprises uniformly contacting said polymer with an amount between about 0.01% and about 50% by weight of said polymer of a polyfunctional sydnone having the formula selected from the group consisting of:

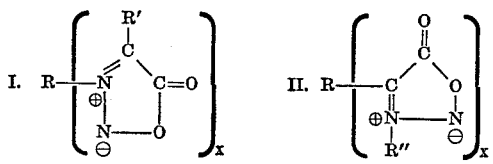

and

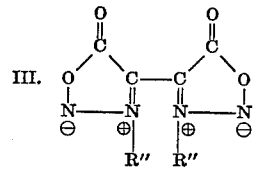

wherein R is a radical selected from the group consisting of alkylene, cycloalkylene, arylene, arylene-dialkylene, alkylene-diarylene, and cycloalkylene-diakyene, R' is a radical selected from the group consisting of hydrogen, alkyl, cycloalkyl, aryl, alkaryl, and halogen, R'' is a radical selected from the group consisting of hydrogen, alkyl, cycloalkyl, aryl, alkaryl and aralkyl, and x is an integer greater than 1; said contacting being carried out at a temperature between about 100° C. and about 300° C.

2. The process of claim 1 wherein said polyfunctional sydnone is a bis(sydnone) having the formula

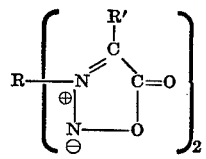

wherein R and R' are as defined in claim 1.

3. The process of claim 2 wherein said bis(sydnone) is hexamethylene-bis(sydnone).

4. The process of claim 2 wherein said bis(sydnone) is p-phenylene bis(sydnone).

5. The process of claim 1 wherein said polyfunctional sydnone is 1,3,5-benzene tris(sydnone).

6. A polymer selected from the group consisting of unsaturated polymers and epihalohydrin polymers crosslinked by heating with a polyfunctional sydnone having the formula selected from the group consisting of:

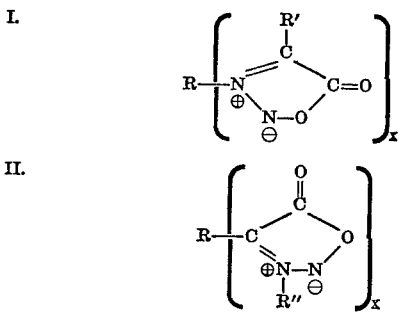

and

III. 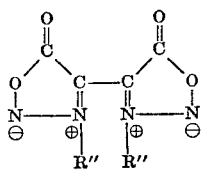

wherein R is a radical selected from the group consisting of alkylene, cycloalkylene, arylene, arylene-dialkylene, alkylene-diarylene, and cycloalkylene-dialkylene; R' is a radical selected from the group consisting of hydrogen, alkyl, cycloalkyl, aryl, alkaryl, aralkyl and halogen; R" is a radical selected from the group consisting of hydrogen, alkyl, cycloalkyl, aryl, alkaryl, and aralkyl; and $x$ is an integer greater than 1.

7. The product of claim 6 wherein the polymer is an unsaturated polyester resin.

8. The product of claim 6 wherein said polymer is a copolymer of an unsaturated epoxide and at least one other epoxide.

9. The product of claim 8 wherein said polymer is a copolymer of propylene oxide and allyl glycidyl ether.

10. The product of claim 8 wherein said polymer is an epichlorohydrin-ethylene oxide-allyl glycidyl ether terpolymer.

11. The product of claim 6 wherein said polymer is an ethylene-propylene-diene terpolymer.

12. The product of claim 6 wherein said polymer is poly epichlorohydrin).

References Cited

UNITED STATES PATENTS 1,792,770  2/1931  Sebrell _____ 260—307.7
2,818,362  12/1957 Drechsel _____ 260—88.3

JAMES A. SEIDLECK, Primary Examiner.

R. S. BENJAMIN, Assistant Examiner.

U.S. Cl. X.R.

260—22, 75, 80.7, 80.78, 83.3, 85.1, 85.3, 88.3, 92.3, 94.7, 307, 768